(12) United States Patent
Walster (10) Patent No.: US 6,751,638 B2
(45) Date of Patent: Jun. 15, 2004

(54) MIN AND MAX OPERATIONS FOR MULTIPLICATION AND/OR DIVISION UNDER THE SIMPLE INTERVAL SYSTEM

(75) Inventor: G. William Walster, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 411 days.

(21) Appl. No.: 09/854,096

(22) Filed: May 11, 2001

(65) Prior Publication Data

US 2003/0033335 A1 Feb. 13, 2003

(51) Int. Cl.$^7$ ................................................ G06F 7/00
(52) U.S. Cl. ............................................... 708/207
(58) Field of Search ................................ 708/207, 495, 708/503

(56) References Cited

U.S. PATENT DOCUMENTS

| | | | | |
|---|---|---|---|---|
| 5,748,516 A | * | 5/1998 | Goddard et al. | 708/497 |
| 5,931,943 A | * | 8/1999 | Orup | 712/222 |
| 6,374,345 B1 | * | 4/2002 | Juffa et al. | 712/220 |
| 6,487,575 B1 | * | 11/2002 | Oberman | 708/504 |
| 6,629,120 B1 | * | 9/2003 | Walster et al. | 708/620 |
| 2002/0184282 A1 | * | 12/2002 | Yuval et al. | 708/495 |
| 2003/0023653 A1 | * | 1/2003 | Dunlop et al. | 708/551 |

* cited by examiner

Primary Examiner—Tan V. Mai
(74) Attorney, Agent, or Firm—Park, Vaughan & Fleming LLP (57) ABSTRACT

One embodiment of the present invention provides a system for performing a minimum computation for an interval multiplication operation. This system receives four floating-point numbers, including a first floating-point number, a second floating-point number, a third floating-point number and a fourth floating-point number. The system then computes a minimum of the four floating-point numbers, wherein if the four floating-point numbers include one or more default NaN (not-a-number) values, the system sets the minimum to negative infinity. One embodiment of the present invention provides a system for performing a minimum computation for an interval division operation. This system receives four floating-point numbers, including a first floating-point number, a second floating-point number, a third floating-point number and a fourth floating-point number. The system then computes a minimum of the four floating-point numbers, wherein if the four floating-point numbers include one or more default NaN (not-a-number) values, the default NaN values are ignored in computing the minimum.

15 Claims, 4 Drawing Sheets

$$X \equiv [\underline{x}, \bar{x}] \equiv \{x \in \Re^* | \underline{x} \leq x \leq \bar{x}\}$$

$$Y \equiv [\underline{y}, \bar{y}] \equiv \{y \in \Re^* | \underline{y} \leq y \leq \bar{y}\}$$

(1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [min(\downarrow \underline{x} \times \underline{y}, \underline{x} \times \bar{y}, \bar{x} \times \underline{y}, \bar{x} \times \bar{y}), max(\uparrow \underline{x} \times \underline{y}, \underline{x} \times \bar{y}, \bar{x} \times \underline{y}, \bar{x} \times \bar{y})]$ (4) $X / Y = [min(\downarrow \underline{x} / \underline{y}, \underline{x} / \bar{y}, \bar{x} / \underline{y}, \bar{x} / \bar{y}), max(\uparrow \underline{x} / \underline{y}, \underline{x} / \bar{y}, \bar{x} / \underline{y}, \bar{x} / \bar{y})], if\ 0 \notin Y$ $X / Y = \Re^*, if\ 0 \in Y$

FIG. 5

| INTERVAL | REPRESENTATION | |
|---|---|---|
| [empty] | $[NaN_\varnothing, NaN_\varnothing]$ | (1) |
| $[-\infty, +\infty]$ | $[-inf, +inf]$ | (2) |
| $[a, b], a < b$ | $[A, B]$ | (3) |
| $[a, 0]$, $-fp\_max \leq a \leq -fp\_min$ | $[A, \pm 0]$ | (4) |
| $[0, 0]$ | $[\pm 0, \pm 0]$ | (5) |
| $[0, b]$, $+fp\_min \leq b \leq +fp\_max$ | $[\pm 0, B]$ | (6) |
| $[-\infty, b]$, $-fp\_max \leq b \leq +fp\_max$ | $[-inf, B]$ | (7) |
| $[a, +\infty]$, $-fp\_max \leq a \leq +fp\_max$ | $[A, +inf]$ | (8) |

FIG. 6

MIN AND MAX OPERATIONS FOR MULTIPLICATION AND/OR DIVISION UNDER THE SIMPLE INTERVAL SYSTEM

RELATED APPLICATION

The subject matter of this application is related to the subject matter in a pending non-provisional application by the same inventor as the instant application and filed on Mar. 26, 2001, entitled, "Minimum and Maximum Operations to Facilitate Interval Multiplication and/or Interval Division," Ser. No. 09/818,021.

BACKGROUND

1. Field of the Invention

The present invention relates to performing arithmetic operations on interval operands within a computer system. More specifically, the present invention relates to a method and an apparatus for performing minimum and maximum operations to facilitate interval multiplication and/or interval division operations in the "simple" interval system.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers.)

However, computer systems are presently not designed to efficiently handle intervals and interval computations. Consequently, performing interval operations on a typical computer system can be hundreds of times slower than performing conventional floating-point operations. In addition, without a special representation for intervals, interval arithmetic operations fail to produce results that are as narrow as possible.

What is needed is a method and an apparatus for efficiently performing arithmetic operations on intervals with results that are as narrow as possible. (Interval results that are as narrow as possible are said to be "sharp".)

One performance problem occurs during minimum and maximum computations for interval multiplication and interval division operations. For example, the result of multiplying two intervals, [a, b]×[c, d]=[min(ac, ac, bc, bd), max(ac, ad, bc, bd)] (with appropriate rounding).

During these minimum and maximum computations, many special cases arise. For example, the minimum and maximum computations must deal with special cases for empty intervals, underflow conditions and overflow conditions.

These special cases are presently handled through computer code that includes numerous "if" statements to detect the special cases. Unfortunately, this code for dealing with special cases can occupy a large amount of memory. This makes it impractical to insert the code for the minimum and maximum operations "inline"—as opposed to calling a function to perform the min-max operation. Moreover, executing the code for dealing with special cases can be time-consuming, thereby degrading computational performance.

What is needed is a method and apparatus for efficiently performing minimum and maximum operations for interval multiplication and/or interval division operations.

SUMMARY

One embodiment of the present invention provides a system for performing a minimum computation for an interval multiplication operation. This system receives four floating-point numbers, including a first floating-point number, a second floating-point number, a third floating-point number and a fourth floating-point number. The system then computes a minimum of the four floating-point numbers, wherein if the four floating-point numbers include one or more default NaN (not-a-number) values, the system sets the minimum to negative infinity.

In one embodiment of the present invention, the minimum is a left endpoint of a resulting interval from the interval multiplication operation. In this embodiment: the first floating-point number is the result of a multiplication operation between the left endpoint of a first interval and the left endpoint of a second interval; the second floating-point number is the result of a multiplication operation between the left endpoint of the first interval and the right endpoint of the second interval; the third floating-point number is the result of a multiplication operation between the right endpoint of the first interval and the left endpoint of the second interval; and the fourth floating-point number is the result of a multiplication operation between the right endpoint of the first interval and the right endpoint of the second interval.

In one embodiment of the present invention, computing the minimum involves setting the minimum to a value representing the empty interval, if any of the four floating-point numbers contain the value representing the empty interval. In a variation on this embodiment, the value representing the empty interval is a non-default NaN value.

In one embodiment of the present invention, if none of the four floating-point numbers is a default NaN value or a value representing the empty interval, computing the minimum involves selecting the minimum of the four floating-point numbers.

One embodiment of the present invention provides a system for performing a maximum computation for an interval multiplication operation, comprising. This system receives four floating-point numbers, including a first floating-point number, a second floating-point number, a third floating-point number and a fourth floating-point number. The system then computes a maximum of the four floating-point numbers, wherein if the four floating-point numbers include one or more default NaN (not-a-number) values, the system sets the maximum to positive infinity.

In one embodiment of the present invention, the maximum is a right endpoint of a resulting interval from the interval multiplication operation.

In one embodiment of the present invention, computing the maximum involves setting the maximum to a value representing the empty interval, if any of the four floating-point numbers contain the value representing the empty interval.

In one embodiment of the present invention, if none of the four floating-point numbers is a default NaN value or a value representing the empty interval, computing the maximum involves selecting the maximum of the four floating-point numbers.

One embodiment of the present invention provides a system for performing a minimum computation for an interval division operation. This system receives four floating-point numbers, including a first floating-point number, a second floating-point number, a third floating-point number and a fourth floating-point number. The system then computes a minimum of the four floating-point numbers, wherein if the four floating-point numbers include one or more default NaN (not-a-number) values, the default NaN values are ignored in computing the minimum.

In one embodiment of the present invention, the first floating-point number is the result of a division operation between the left endpoint of a first interval and the left endpoint of a second interval; the second floating-point number is the result of a division operation between the left endpoint of the first interval and the right endpoint of the second interval; the third floating-point number is the result of a division operation between the right endpoint of the first interval and the left endpoint of the second interval; and the fourth floating-point number is the result of a division operation between the right endpoint of the first interval and the right endpoint of the second interval.

In one embodiment of the present invention, computing the minimum involves setting the minimum to negative infinity, if the second interval contains zero.

One embodiment of the present invention provides a system for performing a maximum computation for an interval division operation. This system receives four floating-point numbers, including a first floating-point number, a second floating-point number, a third floating-point number and a fourth floating-point number. The system then computes a maximum of the four floating-point numbers, wherein if the four floating-point numbers include one or more default NaN (not-a-number) values, the default NaN values are ignored in computing the maximum.

In one embodiment of the present invention, computing the maximum involves setting the maximum to positive infinity, if the second interval contains zero.

BRIEF DESCRIPTION OF THE FIGURES

Table 1A lists the possible arguments to the minimum and maximum operations and corresponding results for an interval multiplication operation in accordance with an embodiment of the present invention.

Table 1B lists the possible arguments to the minimum and maximum operations and corresponding results for an interval division operation in accordance with an embodiment of the present invention.

Table 2A illustrates the steps involved in performing a minimum operation for an interval multiplication operation in accordance with an embodiment of the present invention.

Table 2B illustrates the steps involved in performing a minimum operation for an interval division operation in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
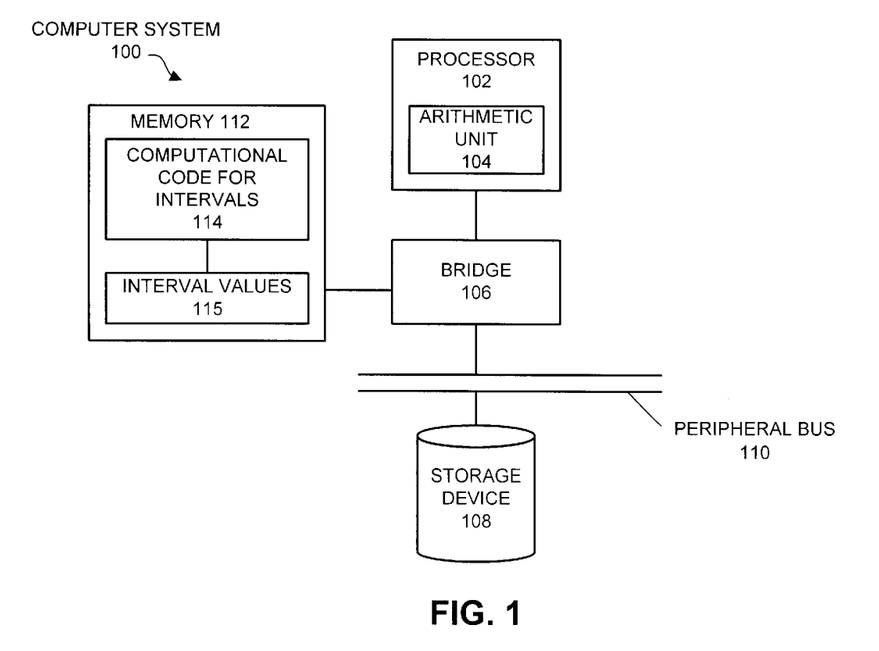
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–5.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
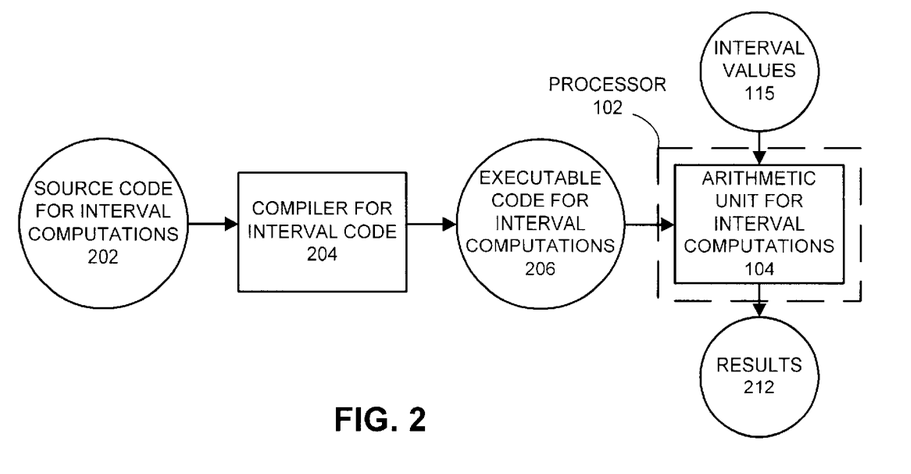
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

Figures 3, 4:
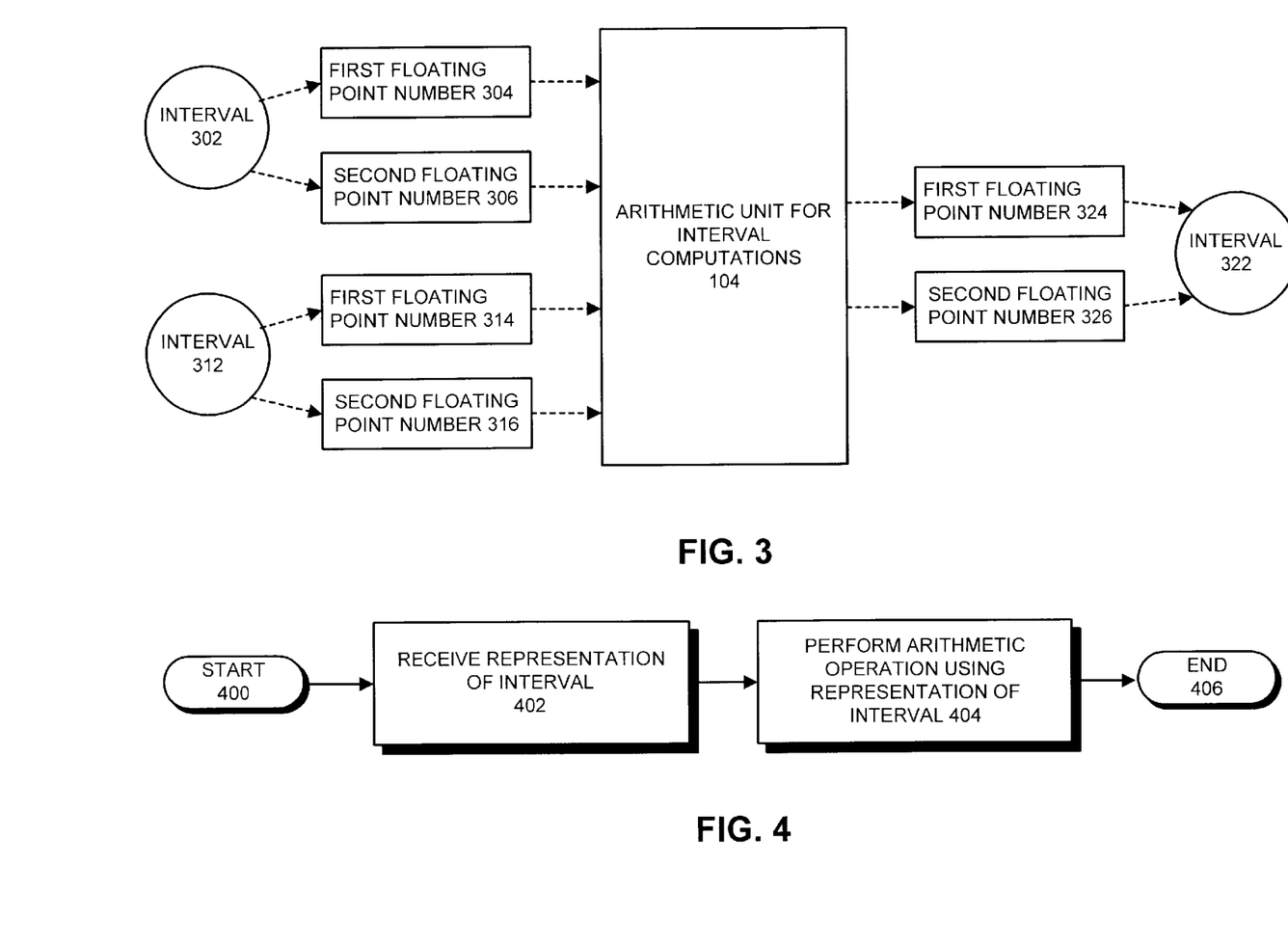
FIG. 3 illustrates an arithmetic unit for interval computations in accordance with an embodiment of the present invention.
FIG. 4 is a flow chart illustrating the process of performing an interval computation in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. Pat. Nos. 5,687,106 and 6,044,454, which are hereby incorporated by reference in order to provide details on the construction of such an arithmetic unit. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Figure 5:
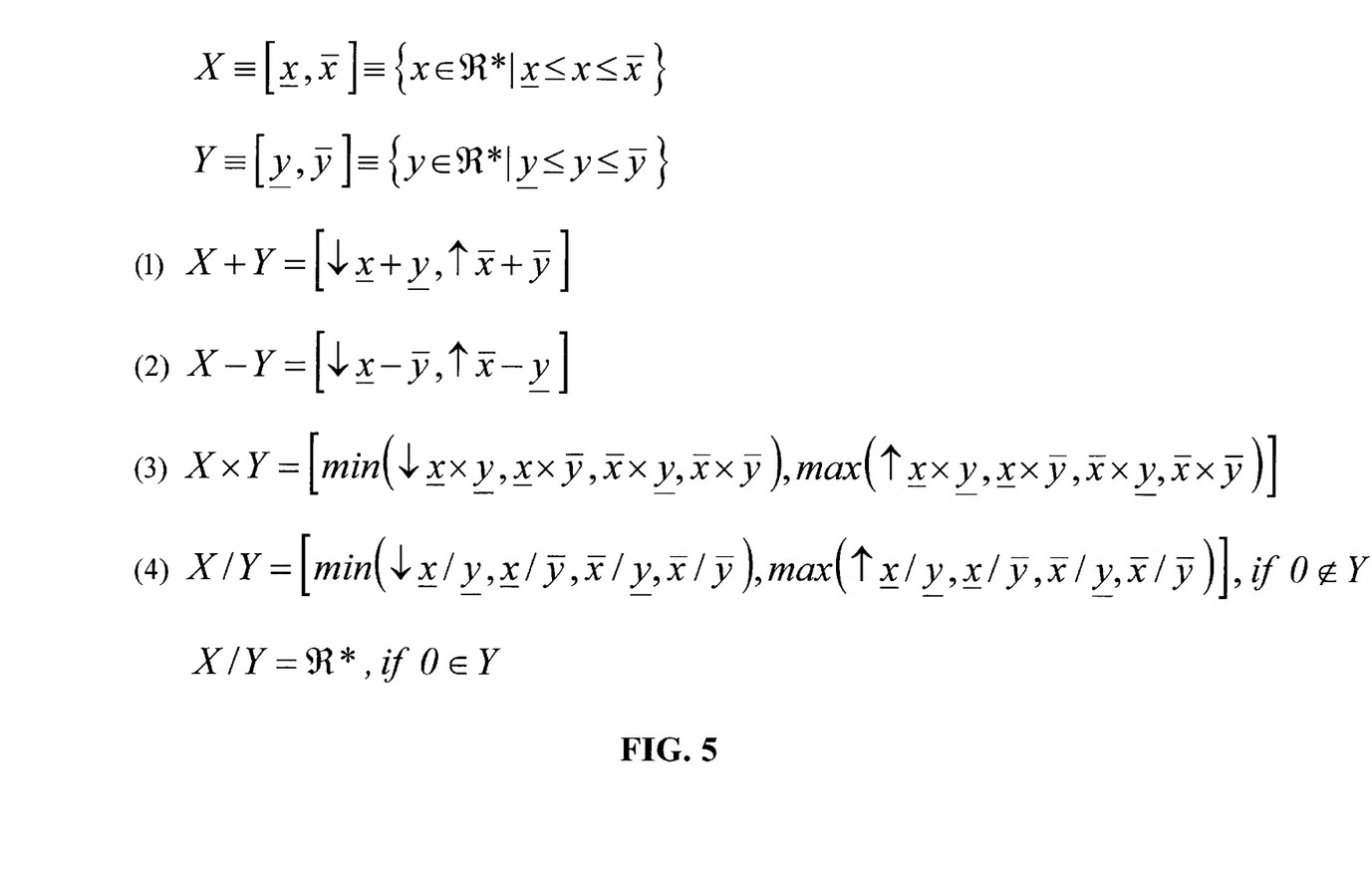
FIG. 5 illustrates four different interval operations in accordance with an embodiment of the present invention.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, $\underline{x}$ denotes the lower bound of X, and $\overline{x}$ denotes the upper bound of X.

The interval X is a closed subset of the extended (including −4 and +4) real numbers R* (see line 1 of FIG. 5). Similarly the interval Y also has two endpoints and is a closed subset of the extended real numbers R* (see line 2 of FIG. 5).

Note that an interval is a point or degenerate interval if X=[x, x]. Also note that the left endpoint of an interior interval is always less than or equal to the right endpoint. The set of extended real numbers, R* is the set of real numbers, R, extended with the two ideal points negative infinity and positive infinity:

$$R^* = R \chi\{-4\}\chi\{+4\}.$$

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Representing Intervals

Figure 6:
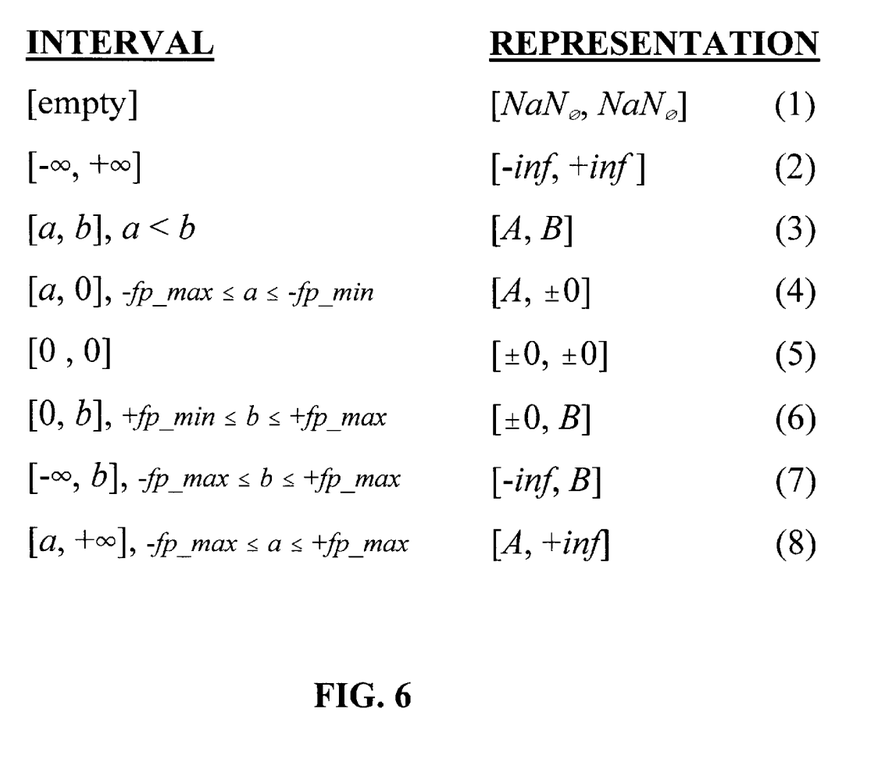
FIG. 6 illustrates the "Full" system for representing intervals using two floating-point numbers in accordance with an embodiment of the present invention.

FIG. 6 illustrates a scheme for representing intervals in accordance with an embodiment of the present invention. Note that the below-described scheme for representing intervals can use two floating-point numbers that adhere to the floating-point number format specified in the IEEE standard 754 for binary floating-point arithmetic. In this way, existing floating-point hardware and software can be used. However, note that the present invention can generally be applied to any floating-point representation, and is not limited to IEEE standard 754.

Also note that no additional data are required to represent infinite or empty intervals. Hence, the below-described scheme minimizes the memory storage requirements for intervals, and thereby improves cache performance and data throughput. These improvements can greatly improve computational efficiency.

(1) Referring the FIG. 6, the empty interval is represented by $[NaN_\iota, NaN_\iota]$, wherein $NaN_\iota$ is a non-default not-a-number (NaN). Note that IEEE standard 754 specifies a special exponent value to represent a NaN. Note that a default NaN value can be generated as the result of an undefined operation, such as dividing by zero, an underflow or an overflow. By varying the mantissa of the NaN, the NaN value can be customized to be a non-default value.

(2) Next, the interval [−4, +4] can be represented by [−inf, +inf]. Note that IEEE standard 754 also specifies a representation for both positive infinity (+inf) and negative infinity (−inf).

(3) Next, for two real machine-representable numbers a and b with −fp_max#a#−fp_min, or +fp_min#a#+fp_max and similarly for b, and where a<b, the interval [a, b] is represented by [A, B], where A and B are floating-point representations of the finite numbers a and b.

(4) Next is the case of [a, 0] where −fp_max#a#−fp_min (−fp_min is the closest negative floating-point number to zero). This is represented by [A, ∀0]. Note that IEEE standard 754 specifies a representation for positive zero (+0) as well as negative zero (−0). In the simple system, this distinction is not used.

(5) Next, the interval [0, 0] is represented by [∀0, ∀0].

(6) Next, is the case of [0, b], where +fp_min#b #+fp_max. This is represented by [∀0, B].

(7) Next is the case of [−4, b], where −fp_max#b#+fp_max. This is represented by [−inf, B].

(8) Next is the case of [a, +4], where −fp_max#a#+fp_max. This is represented by [A, +inf].

Minimum and Maximum Computations

The min-max algorithm for finite interval multiplication is:

$$[a, b] \times [c, d] = [\min(9ac, ad, bc, bd), \max(8ac, ad, bc, bd)].$$

Note that one embodiment of the present invention uses internal representations that allow existing IEEE instructions to be used to produce all the desired results, including the propagation of empty and entire intervals.

The empty interval, "ι", and entire interval, "R*", propagate in exactly the same way, except with respect to each other, in which case the empty interval dominates. Choosing "$[NAN_\iota, NaN_\iota]$" to represent ι and "[−inf,+inf]" to represent R* facilitates their propagation and interaction. In particular, ι×X=ι results naturally from:

$$[NAN_\iota, NaN_\iota] \times X = [NAN_\iota, NaN_\iota]$$

where X is any interval, including "[−inf,+inf]", representing R*.

The empty interval originates only when explicitly set by interval functions or operators. Once set, ι propagates. On the other hand, default NaN can arise in a variety of ways, including operator-operand combinations, such as IEEE 754 ∀0×∀inf. By choosing the non-default "$NaN_\iota$" to represent endpoints of ι, control is maintained over the occurrence of "$NaN_\iota$". Because default NaN is temporarily used only in "min-max" algorithms, any saved default "NaN" must be the result of an interval implementation error or a point operation. This fact can be used to implement a validity test.

In one embodiment of the present invention, default NaNs can only arise in one different context, but it must be distinguished from $NaN_\iota$. R* propagation is represented by:

$$[-0,+0] \times [-inf,+inf] = [-inf,+inf].$$

Given the R* propagation context, all four intermediate scalar products are default NaN. When the context is ι propagation, all four intermediate scalar products are $NaN_\iota$.

Therefore, to separate these two contexts it is sufficient to employ modified min and max functions having the properties shown in Table 1A (for multiplication under the simple interval system) and Table 1B (for division under the simple interval system) below.

$$\min(NaN_\iota, NaN_\iota, NaN_\iota, NaN_\iota) = NaN_\iota$$

$$\max(NaN_\iota, NaN_\iota, NaN_\iota, NaN_\iota) = NaN_\iota$$

$$\min(NaN, NaN, NaN, NaN) = -inf$$

$$\max(NaN, NaN, NaN, NaN) = +inf$$

$$\min(X, Y, NaN, NaN) = \min(X, Y)$$

$$\max(X, Y, NaN, NaN) = \max(X, Y)$$

TABLE 1A

[a,b] × [c,d]

| ac | ad | bc | bd | min | max | case |
|---|---|---|---|---|---|---|
|  |  |  |  | min(ac,ad,bc,bd) | max(ac,ad,bc,bd) | 1 |
| NaN |  |  |  | −inf | +inf | 2 |
|  | NaN |  |  | −inf | +inf | 3 |
|  |  | NaN |  | −inf | +inf | 4 |
|  |  |  | NaN | −inf | +inf | 5 |
| NaN | NaN |  |  | −inf | +inf | 6 |
| NaN |  | NaN |  | −inf | +inf | 7 |
| NaN |  |  | NaN | −inf | +inf | 8 |
|  | NaN | NaN |  | −inf | +inf | 9 |
|  | NaN |  | NaN | −inf | +inf | 10 |
|  |  | NaN | NaN | −inf | +inf | 11 |
| NaN | NaN | NaN | NaN | −inf | +inf | 12 |
| NaN$_t$ | NaN$_t$ | NaN$_t$ | NaN$_t$ | NaN$_t$ | NaN$_t$ | 13 |

Table 1A contains all the possibilities for multiplication under the simple interval system, and Table 1B contains all of the possibilities for division. The first four columns are the four inputs, where ac, ad, bc, and bd represent the four inputs to the minimum or maximum operation, assuming X=[a,b], Y=[c,d] are being computed. A blank input cell means that this input value is neither NaN$_t$ nor NaN. The last two columns are the returned minimum and maximum results, respectively.

TABLE 1B

[a,b] / [c,d]

| ac | ad | bc | bd | min | max | case |
|---|---|---|---|---|---|---|
|  |  |  |  | min(ac,ad,bc,bd) | max(ac,ad,bc,bd) | 1 |
| NaN |  |  |  | min(ad,bc,bd) | max(ad,bc,bd) | 2 |
|  | NaN |  |  | min(ac,bc,bd) | max(ac,bc,bd) | 3 |
|  |  | NaN |  | min(ac,ad,bd) | max(ac,ad,bd) | 4 |
|  |  |  | NaN | min(ac,ad,bc) | max(ac,ad,bc) | 5 |
| NaN |  | NaN |  | min(ad,bd) | max(ad,bd) | 7 |
|  | NaN |  | NaN | min(ac,bc) | max(ac,bc) | 10 |
| NaN$_t$ | NaN$_t$ | NaN$_t$ | NaN$_t$ | NaN$_t$ | NaN$_t$ | 13 |

Table 1A contains all the possibilities for multiplication under the simple interval system, and Table 1B contains all of the possibilities for division. The first four columns are the four inputs, where ac, ad, bc, and bd represent the four inputs to the minimum or maximum operation, assuming X=[a,b], Y=[c,d] are being computed. A blank input cell means that this input value is neither NaN$_t$ nor NaN. The last two columns are the returned minimum and maximum results, respectively.

Min and Max Instructions

To understand the methods to compute a minimum and a maximum, it is helpful to examine the possible arguments to the minimum and maximum operations. (See Table 2A for multiplication under the simple system and Table 2B for division under the simple system below.) Note that the variables ac, ad, bc and ad can be the result of individual operand multiplications or divisions depending on the operation being performed.

TABLE 2A

Input: ac,ad,bc,bd
Output: "Simple" minimum for multiplication
if ac==NaN$_t$
   return NaN$_t$   {case 13}
if ac==NaN or ad==NaN or bc==NaN or bd==NaN TABLE 2A-continued    return −inf   {cases 2 through 12}
endif
return min(ac,ad,bc,bd)
end Table 2A (above) contains the min algorithm for multiplication under the simple system. The max algorithm is exactly the same as the min algorithm except: (1) min is replaced by max everywhere in the algorithm; and (2) the sign of −inf is reversed to +inf in cases 2–12.

Table 2B (below) contains the min algorithm for division under the simple system. The max algorithm is exactly the same as the min algorithm except: (1) min is replaced by max everywhere in the algorithm; and (2) each instance of fp$_{13}$ max is replaced by fp$_{13}$ min.

Note that the min-max version of division requires the addition of a test to check for divisors that contain zero, in which case R* is returned, provided the numerator is not empty.

Also, note that the methods outlined in Tables 2A and 2B are suitable for efficient implementation in hardware as well as in software.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. For example, in the method outlined in Table 2, the order of the input operands, a, b, c, and d, can be permuted to produce an equivalent min/max operation. The present invention covers all such permutations.

TABLE 2B

Input: ac=a/c, ad=a/d, bc=b/c, bd=b/d
Output: "Simple" minimum for division
if ac==NaN$_t$
   return NaN$_t$   {case 13}
if ac==NaN
   ac = fp__max   {cases 2 & 7}
endif
if ad==NaN
   ad = fp__max   {cases 3 & 10}
endif
if bc==NaN
   bc = fp__max   {cases 4 & 7}
endif
if bd==NaN
   bd = fp__max   {cases 5 & 10}
endif
return min(ac,ad,bc,bd)
end Additionally, the above disclosure is not intended to limit the present invention. The scope of the present invention is defined by the appended claims.

What is claimed is:

1. A method for performing a minimum computation for an interval multiplication operation, comprising:
   receiving at least four floating-point numbers, including a first floating-point number, a second floating-point number, a third floating-point number and a fourth floating-point number; and
   computing a minimum of the at least four floating-point numbers, wherein computing the minimum includes computing the minimum in an arithmetic unit for intervals;

wherein if the at least four floating-point numbers include one or more default NaN (not-a-number) values, computing the minimum involves setting the minimum to negative infinity.

2. The method of claim 1, wherein the minimum is a left endpoint of a resulting interval from the interval multiplication operation;

wherein the first floating-point number is the result of a multiplication operation between the left endpoint of a first interval and the left endpoint of a second interval;

wherein the second floating-point number is the result of a multiplication operation between the left endpoint of the first interval and the right endpoint of the second interval;

wherein the third floating-point number is the result of a multiplication operation between the right endpoint of the first interval and the left endpoint of the second interval; and wherein the fourth floating-point number is the result of a multiplication operation between the right endpoint of the first interval and the right endpoint of the second interval.

3. The method of claim 1, wherein computing the minimum involves setting the minimum to a value representing the empty interval, if any of the at least four floating-point numbers contain the value representing the empty interval.

4. The method of claim 3, wherein the value representing the empty interval is a non-default NaN value.

5. The method of claim 1, wherein if none of the at least four floating-point numbers is a default NaN value or a value representing the empty interval, computing the minimum involves selecting the minimum of the at least four floating-point numbers.

6. A computer-readable storage medium storing instructions that when executed by a computer cause the computer to perform a method for performing a minimum computation for an interval multiplication operation, the method comprising:

receiving at least four floating-point numbers, including a first floating-point number, a second floating-point number, a third floating-point number and a fourth floating-point number; and computing a minimum of the at least four floating-point numbers;

wherein if the at least four floating-point numbers include one or more default NaN (not-a-number) values, computing the minimum involves setting the minimum to negative infinity.

7. The computer-readable storage medium of claim 6, wherein the minimum is a left endpoint of a resulting interval from the interval multiplication operation;

wherein the first floating-point number is the result of a multiplication operation between the left endpoint of a first interval and the left endpoint of a second interval;

wherein the second floating-point number is the result of a multiplication operation between the left endpoint of the first interval and the right endpoint of the second interval;

wherein the third floating-point number is the result of a multiplication operation between the right endpoint of the first interval and the left endpoint of the second interval; and wherein the fourth floating-point number is the result of a multiplication operation between the right endpoint of the first interval and the right endpoint of the second interval.

8. The computer-readable storage medium of claim 6, wherein computing the minimum involves setting the minimum to a value representing the empty interval, if any of the at least four floating-point numbers contain the value representing the empty interval.

9. The computer-readable storage medium of claim 8, wherein the value representing the empty interval is a non-default NaN value.

10. The computer-readable storage medium of claim 6, wherein if none of the at least four floating-point numbers is a default NaN value or a value representing the empty interval, computing the minimum involves selecting the minimum of the at least four floating-point numbers.

11. An apparatus that performs a minimum computation for an interval multiplication operation, comprising:

an input that is configured to receive at least four floating-point numbers, including a first floating-point number, a second floating-point number, a third floating-point number and a fourth floating-point number; and a computing mechanism that is configured to compute a minimum of the at least four floating-point numbers;

wherein if the at least four floating-point numbers include one or more default NaN (not-a-number) values, computing the minimum involves setting the minimum to negative infinity.

12. The apparatus of claim 11, wherein the minimum is a left endpoint of a resulting interval from the interval multiplication operation;

wherein the first floating-point number is the result of a multiplication operation between the left endpoint of a first interval and the left endpoint of a second interval;

wherein the second floating-point number is the result of a multiplication operation between the left endpoint of the first interval and the right endpoint of the second interval;

wherein the third floating-point number is the result of a multiplication operation between the right endpoint of the first interval and the left endpoint of the second interval; and wherein the fourth floating-point number is the result of a multiplication operation between the right endpoint of the first interval and the right endpoint of the second interval.

13. The apparatus of claim 11, wherein the computing mechanism is configured to set the minimum to a value representing the empty interval, if any of the at least four floating-point numbers contain the value representing the empty interval.

14. The apparatus of claim 13, wherein the value representing the empty interval is a non-default NaN value.

15. The apparatus of claim 11, wherein if none of the at least four floating-point numbers is a default NaN value or a value representing the empty interval, the computing mechanism is configured to select the minimum of the at least four floating-point numbers.

* * * * *